US006385554B1

(12) United States Patent
Wu

(10) Patent No.: US 6,385,554 B1
(45) Date of Patent: May 7, 2002

(54) DIGITAL TIRE GAUGE WITH VISUAL AND VOICE RESPONSE SYSTEM

(76) Inventor: Leo Wu, No.400, Sec.4, Ting Tsao Road, Lu-Kang, Chang Hua Hsien (TW)

( * ) Notice: Subject to any disclaimer, the term of this patent is extended or adjusted under 35 U.S.C. 154(b) by 0 days.

(21) Appl. No.: 09/432,095

(22) Filed: Nov. 2, 1999

(51) Int. Cl.⁷ .............................................. G01L 17/00
(52) U.S. Cl. ........................ 702/140; 702/140; 702/122
(58) Field of Search ............................ 73/146.5, 146.8, 73/398, 723; 364/558; 374/121; 141/95; 702/140, 114, 122

(56) References Cited

U.S. PATENT DOCUMENTS

| | | | | |
|---|---|---|---|---|
| 3,762,223 A | * | 10/1973 | Feuer et al. ................... | 73/398 |
| 4,250,759 A | * | 2/1981 | Vago et al. .................... | 73/723 |
| 4,389,884 A | * | 6/1983 | Agulia ....................... | 73/146.5 |
| 4,456,038 A | * | 6/1984 | Gwaltney et al. ............. | 141/95 |
| 4,703,650 A | * | 11/1987 | Dosjoub et al. ........... | 73/146.5 |
| 4,704,901 A | * | 11/1987 | Rocco et al. .............. | 73/146.8 |
| 4,748,845 A | * | 6/1988 | Rocco et al. .............. | 73/146.8 |
| 4,998,438 A | * | 3/1991 | Martin ..................... | 73/146.8 |
| 5,168,751 A | * | 12/1992 | Hwang ..................... | 73/146.8 |
| 5,394,343 A | * | 2/1995 | Tsao ........................... | 364/558 |
| 5,625,144 A | * | 4/1997 | Chang ....................... | 73/146.3 |
| 6,095,682 A | * | 8/2000 | Hollander et al. .......... | 374/121 |

\* cited by examiner

Primary Examiner—John S. Hilten
Assistant Examiner—Douglas N Washburn
(74) Attorney, Agent, or Firm—Troxell Law Office PLLC

(57) ABSTRACT

A digital tire pressure gauge with visual and voice response system is disclosed. The digital tire pressure gauge includes a pressure transducer, a pair of switching units, an integrator for generating a triangular waveform signal with an increasing ramp section and a decreasing ramp section, a comparator used to compare the triangular waveform signal of the integrator with a reference signal and then generate an output signal with a wave width corresponding to the increasing ramp section of the output signal of the integrator, a register for temporally storing the output signal of the comparator, a peak value detector, a holding circuit, a counting pulse generating circuit, a counting circuit, and a pressure value output buffer. A display is used to display the pressure value stored in the output buffer. A speech processing circuit is used to generate a speech signal accompanying with the display of the visual pressure value signal displayed on the display. A timer circuit is further coupled to the speech processing circuit for generating an actuating signal at preset regular intervals for triggering the speech processing circuit to play a predetermined reminding speech.

2 Claims, 2 Drawing Sheets

DIGITAL TIRE GAUGE WITH VISUAL AND VOICE RESPONSE SYSTEM

BACKGROUND OF THE INVENTION

1. Field of the Invention

The present invention relates to a tire pressure gauge, and more particularly to a digital pressure gauge with visual and voice response system for measuring the air pressure of a tire.

2. Description of the Prior Art

It is extremely important for driving safety to ensure that the tires of an automobile or motorcycle normally function. The air pressure of the tire is a major factor determining whether the tire can normally function.

In order to measure the tire pressure, in addition to visual observation, a tire pressure gauge is generally used to more precisely measure the tire pressure.

The conventional tire pressure gauges may be in the form of analog type and digital type. The digital type tire pressure gauge is able to directly convert the measured tire pressure into numerals. Accordingly, a user can conveniently read accurate tire pressure from a display of the tire pressure gauge.

An example of a prior art tire gauge is disclosed in U.S. Pat. No. 5,394,343, issued Feb. 28, 1995, issued to Tsao, entitled "Electronic Tire Gauge". This prior art invention provides an electronic tire pressure gauge comprising a pressure transducer, a voltage controlled oscillator, a comparator, a clock, a microprocessor, and a display. The display is capable of displaying a numerical value of the measured pressure of the tire.

Another example of the prior art tire gauge is disclosed in U.S. Pat. No. 4,250,759, issued Feb. 17, 1981, issued to Vago et al., entitled "Digital Readout Gauge". This prior art invention provides a digital tire gauge mainly comprising a pressure transducer, a peak detector, an analog-to-digital converter, and a display.

It is noted that the conventional digital type tire pressure gauges can only display the tire pressure by numerals, so that in some situations such as deflected observation position, insufficient illumination, failing to directly see with eyes, etc., the user will be unable to visually obtain the tire pressure.

Moreover, it is very important to periodically service the tire for ensuring safety in use of vehicles, especially with respect to heavy vehicles. However, users of automobiles and motorcycles often neglect to periodically check the tire.

It is thus desirable to have a digital tire pressure gauge with visual and voice response for overcoming the problems discussed above.

SUMMARY OF THE INVENTION

It is therefore a primary object of the present invention to provide a tire pressure gauge with function of digital display of tire pressure. In cooperation with the digital display, a speech indicative of the tire pressure is simultaneously emitted, whereby under a circumstance that a user can hardly visually observe the displayed tire pressure value, the user can still know the tire pressure value via the speech indication.

It is a further object of the present invention to provide a tire pressure gauge which not only has functions of digital display and speech indication of the tire pressure value, but also has a function of timed reminding. Therefore, when a predetermined time is reached, a vehicle-user is reminded to check whether the tire pressure in normal so as to ensure safety in driving.

To achieve the above objects, in accordance with the present invention, there is provided a digital tire pressure gauge with an electronic control circuit for measuring the air pressure of the tire. The electronic control circuit comprises a pressure transducer, a pair of switching units, an integrator for receiving the analog output signal of the pressure transducer and then generating a triangular waveform signal with an increasing ramp section and a decreasing ramp section under control of the first and second switching units, a comparator used to compare the triangular waveform signal of the integrator with a reference signal and then generate an output signal with a wave width corresponding to the increasing ramp section of the output signal of the integrator, a register for temporally storing the output signal of the comparator, a peak value detector, a holding circuit, a counting pulse generating circuit, a counting circuit, and a pressure value output buffer. A display mounted on the tire gauge is used to display the pressure value stored in the output buffer. A speech processing circuit is used to generate a speech signal accompanying with the display of the visual pressure value signal displayed on the display. Further, a timer circuit may be coupled to the speech processing circuit for generating an actuating signal at preset regular intervals for triggering the speech processing circuit to play a predetermined reminding speech.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENT

Figure 1:
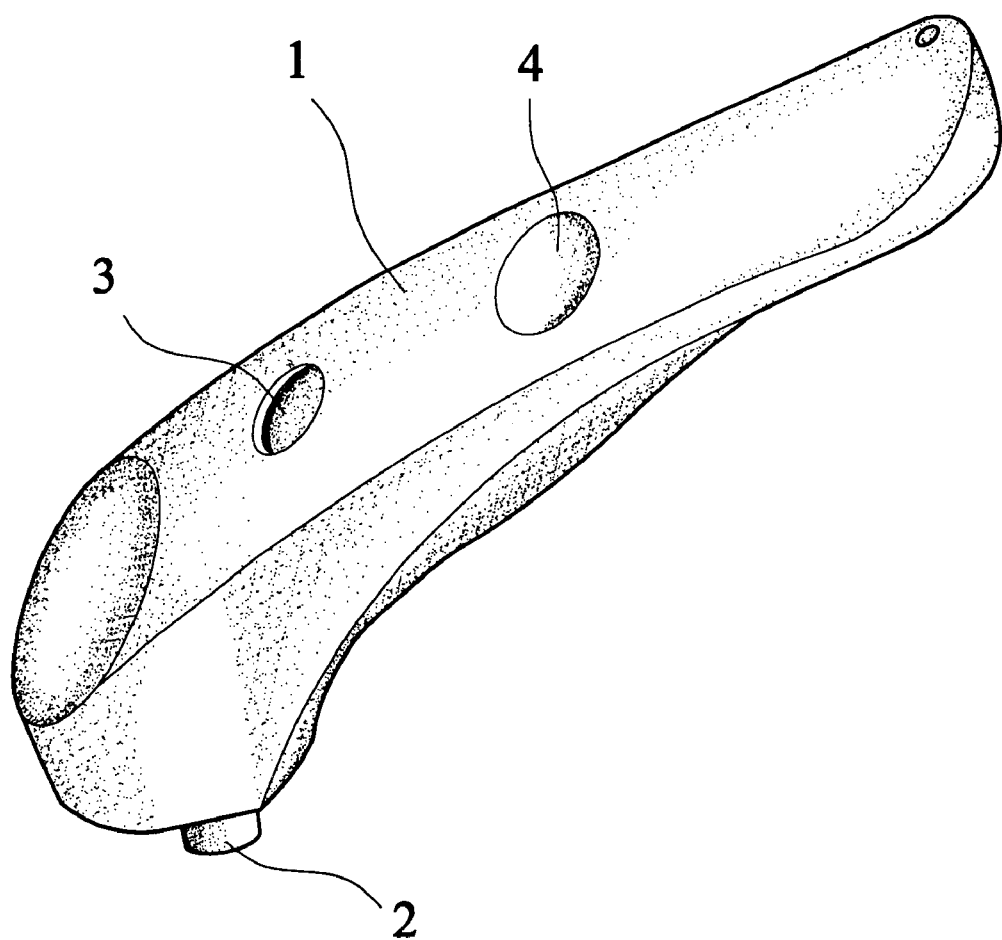
FIG. 1 is a perspective view of a digital tire pressure gauge of the present invention.

With reference to FIG. 1, a digital tire pressure gauge constructed in accordance with the present invention is shown. The digital tire pressure gauge includes a housing 1, an valve stem fitting 2, an LCD display 3 and an operation switch 4.

The valve stem fitting 2 is disposed at one end of the housing 1. In operation, the valve stem fitting 2 is fitted with the valve stem of the tire to be measured so as to guide the tire pressure into the tire pressure gauge. Tire pressure is measured upon depression of the operation switch 4. After processed by the electronic control circuit of the tire pressure gauge, the value of the tire pressure is displayed on the LCD display 3. At the same time, a speech generation circuit of the tire pressure gauge generates a speech signal of the tire pressure.

Figure 2:
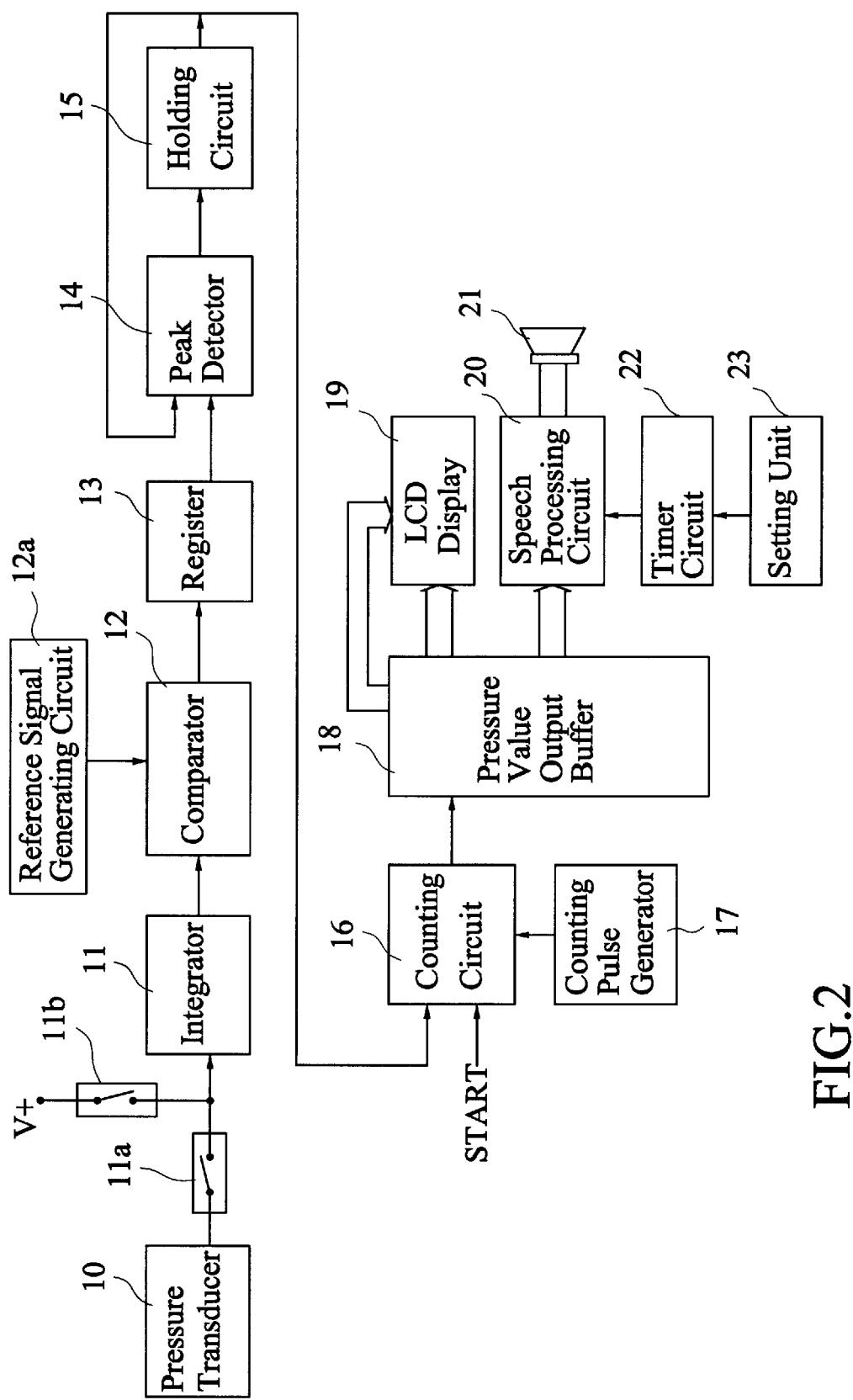
FIG. 2 is a block circuit diagram of the tire pressure gauge of the present invention.

FIG. 2 shows a functional circuit block diagram of the present invention. The pressure transducer 10 is used to detect and measure the pressure value of the measured tire and then generate an analog output signal at its output terminal. The pressure transducer 10 may be a silicon square diaphragm with four resistors configured in a full wheatstone bridge for sensing the tire pressure.

The signal sensed by the pressure transducer 10 is sent to an integrator 11. Under control of a pair of switching units 11a, 11b, the output terminal of the integrator 11 is capable of generating a triangular waveform signal with an increasing ramp section and a decreasing ramp section. One end of the first switching unit 11a is connected to the output end of the pressure transducer 10, and the other end of which is connected to the input terminal of the integrator 11. One end of the second switching unit 11b is connected to a positive voltage V+, and the other end of which is also connected to the input terminal of the integrator 11.

The signal generated by the integrator 11 is sent to one of the input terminals of a comparator 12. The other input terminal of the comparator 12 is connected to a reference signal generating circuit 12a for receiving a reference signal. After the comparator 12 compares the signal generated by the integrator 11 with the reference signal generated by the reference signal generating circuit 12a, the comparator 12 generates an output signal with a wave width corresponding to the increasing ramp section of the output signal of the integrator 11.

The output signal of the comparator 12 is then sent to a register 13 for storing the signal. A peak value detector 14 is used to measure the peak value of the output signal stored in the register 13. A holding circuit 15 is used to hold the peak value of the output signal measured by the peak value detector 14.

After detecting and holding the peak value of the output signal, a counting circuit is activated by a start signal START generated by the operation switch 4 as shown in FIG. 1 to calculate the counting value of the output signal held in the holding circuit 15. When the counting circuit 16 counts, a counting pulse generating circuit 17 is used to provide counting pulse signal for the counting circuit 16. So, a pressure value signal representing the air pressure of the tire to be measured is calculated and then stored in a pressure value output buffer 18. Either a light emitting diode (LED) or a liquid crystal display (LCD) 19 can be used to display the pressure value signal stored in the pressure value output buffer 18.

The present invention also includes a speech processing circuit 20 capable of receiving the pressure value signal of the pressure value output buffer 18 and generating a speech signal via a speaker 21. Preferably, the speech signal is generated accompanying with the visual pressure value signal displayed on the display 19.

In addition, a timer circuit 22 is coupled to the, speech processing circuit 20, capable of generating an actuating signal at preset regular intervals for triggering the speech processing circuit 20 to play a predetermined reminding speech so as to remind the driver to periodically check the tire. The preset regular intervals may be further set by a setting unit 23.

Although the preferred embodiment of the present invention has been described to illustrate the present invention, it is apparent that changes and modifications in the specifically described embodiment can be carried out without departing from the scope of the invention which is intended to be limited only by the appended claims.

What is claimed is:

1. A digital tire gauge for measuring an air pressure of a tire comprising:

a housing;

a valve stem fitting mounted at one end of the housing for receiving and guiding the air pressure of the tire into the housing;

a pressure transducer for measuring the air pressure value of the tire and outputting an analog output signal at an output end;

a first switching unit having a first end connected to the output end of the pressure transducer and a second end;

a second switching unit having a first end connected to a positive voltage and a second end connected to the second end of the first switching unit;

an integrator having an input terminal connected to the second ends of the first switching unit and the second switching unit, for receiving the analog output signal of the pressure transducer and then generating a triangular waveform signal with an increasing ramp section and a decreasing ramp section under control of the first and second switching units;

a comparator having a first input terminal receiving the triangular waveform signal of the integrator and a second input terminal connected to a reference signal generating circuit, generating an output signal with a wave width corresponding to the increasing ramp section of the output signal of the integrator;

a register for storing the output signal of the comparator;

a peak value detector to measure the peak value of the output signal stored in the register;

a holding circuit to hold the peak value of the output signal measured by the peak value detector;

a counting pulse generating circuit providing a series of counting pulse signals;

a counting circuit for calculating a counting value of the output signal held in the holding circuit with respect to the counting pulse signal of the counting pulse generating circuit, and then generating a pressure value signal representing the air pressure of the tire;

a pressure value output buffer storing the pressure value signal;

a display for displaying the pressure value signal stored in the pressure value output buffer;

a speech processing circuit receiving the pressure value signal of the pressure value output buffer and generating a speech signal accompanying with the display of the visual pressure value signal displayed on the display; and, a timer circuit coupled to the speech processing circuit for generating an actuating signal at preset regular intervals for triggering the speech processing circuit to play a predetermined reminding speech.

2. The digital tire gauge as claimed in claim 1 further comprising a setting unit coupled to the timer circuit for setting the preset regular intervals of the timer circuit.

* * * * *